United States Patent Office 3,164,593
Patented Jan. 5, 1965

3,164,593
ANTHRAQUINONE VAT DYESTUFFS OF THE PHTHALOYLACRIDONE SERIES
Eduard Moergeli, Muttenz, Switzerland, assignor to Ciba Limited, Basel, Switzerland, a company of Switzerland
No Drawing. Filed May 20, 1963, Ser. No. 281,812
Claims priority, application Switzerland, May 28, 1962, 6,459/62
6 Claims. (Cl. 260—249)

The present invention provides valuable blue anthraquinone vat dyestuffs of the formula (1)
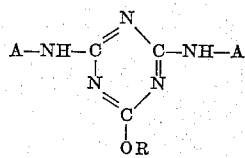

in which A— represents a 3:4-phthaloylacridone residue bound to the —NH— group in 2-position and R represents a benzene residue.

The new dyestuff are obtained by condensing one mol of cyanuric chloride in any desired sequence with 2 mols of 2-amino-3:4-phthaloylacridone and one mol of a hydroxybenzene.

Thus, one mole of cyanuric chloride can first be condensed with 2 mols of the 2-amino-3:4-phthaloylacridone and the resulting condensation product of the formula (2)
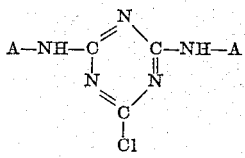

then condensed with a hydroxybenzene or, advantageously, one mol of cyanuric chloride is first condensed with one mol of the hydroxybenzene to form the condensation product of the formula (3)
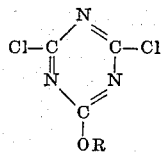

which is then condensed with 2 mols of the 2-amino-3:4-phthaloylacridone to form the finished dyestuff.

The 2-amino-3:4-phthaloylacridones used as starting materials in the process of the invention can contain substituents in the acridone or phthaloyl residue, for example, halogen atoms. As examples unsubstituted 2-amino-3:4-phthaloylacridone may be mentioned and more especially 2-amino-6- or -7-chloro-3:4-phthaloylacridone.

The hydroxybenzenes used in the process of the invention can contain further substituents in the benzene residue, for example, halogen atoms, or alkyl, trifluoromethyl, alkoxy, carbalkoxy, acyl or alkylsulfonyl groups. It is advantageous to use compounds of the formula

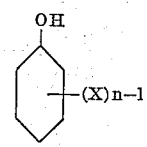

in which X represents a chlorine atom or a trifluoromethyl group and n represents an integer not greater than 3. The following may be mentioned by way of example: phenol, 1-hydroxy - 3 - trifluoromethylbenzene, 1-hydroxy-3:5-di-(trifluoromethyl)-benzene and more especially 1-hydroxy-2- or 4-chlorobenzene, 1-hydroxy-2- or 4-methylbenzene, 1-hydroxy-3-methoxybenzene, 1-hydroxy-2- or 4-bromobenzene, 4-hydroxybenzene carboxylic acid methyl ester or 2- or 4-hydroxyacetophenone.

The reactions are advantageously carried out in a solvent or diluent. For the preparation of a compound of the Formula 3, the condensation is advantageously carried out in an aqueous medium in the cold, an inert solvent miscible with water, for example, acetone or dioxane being advantageously added to the water, and also an agent capable of binding acid, for example, sodium bicarbonate, sodium carbonate or sodium hydroxide. The condensation of a compound of the Formula 3 with a 2-amino-3:4-phthaloylacridone, the condensation of cyanuric chloride with a 2-amino-3:4-phthaloylacridone to form a compound of the Formula 2 and the condensation of the latter compounds with the hydroxybenzene have to be carried out under much more rigorous conditions, the reactions advantageously being performed in a solvent having a high boiling point, for example, nitrobenzene, ortho-dichlorobenzene, naphthalene or phenol and their derivatives. These reactions are advantageously carried out at a temperature above 100° C. To obtain a compound of Formula 2 the condensation is advantageously carried out in nitrobenzene, and the subsequent stage is advantageously carried out in an excess of the hydroxybenzene.

The products obtained by the process of the invention are suitable for dyeing and printing a very wide variety of materials, especially for dyeing and printing fibres made of natural or regenerated cellulose. The dyeings obtained therewith are distinguished by valuable reddish blue tints and by a good fastness to light. They have good properties of wet fastness and are especially fast to soda boiling, chlorine and chlorite. The new dyestuffs can also be used as pigments.

The following examples illustrate the invention. The parts and percentages are by weight.

*Example 1*

A mixture of 5.6 parts of 2-amino-7-chloro-3:4-phthaloylacridone, 2.05 parts of 2-(2'-chlorophenoxy)-4:6-dichloro-symmetrical-triazine, 0.3 part of metanitrobenzene sulfonic acid and 50 parts by volume of nitrobenzene was stirred for 16 hours at 130 to 135° C. and then for 3 hours at 150 to 155° C. 1 part by volume of benzoyl chloride was then added and the whole stirred for 3 hours at 150 to 155° C. The dyestuff of the formula

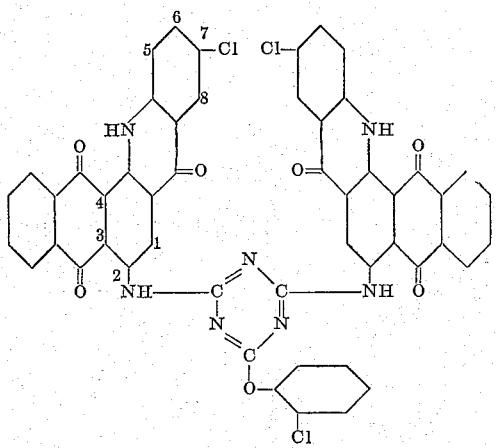

which crystallized in the form of small blue needles, was filtered at 80 to 90° C., washed with nitrobenzene and alcohol and then dried. It dyed cotton blue tints fast to chlorite and soda boiling from a red-violet vat.

By replacing the 2-(2'-chlorophenoxy)-4:6-dichloro-symmetrical-triazine by an equimolecular proportion of 2-(3'-trifluoromethyl-phenoxy)-4:6-dichloro-symmetrical-triazine, 2-(4'-chlorophenoxy)-4:6-dichloro-symmetrical-triazine and 2-phenoxy-4:6-dichloro-symmetrical -triazine, dyestuffs having similar dyeing properties were obtained.

By using 2-amino-6-chloro-3:4-phthaloylacridone or 2-amino-3:4-phthaloylacridone instead of 2-amino-7-chloro-3:4-phthaloylacridone and reacting with the aforementioned O-chloro-phenoxy-dichloro-symmetrical-triazines as described above, products were obtained which gave reddish blue dyeings on cotton that likewise showed a high degree of fastness.

The phenoxy-4:6-dichlorotriazines were obtained, for example, as follows: with continuous stirring a solution of 18.4 parts of cyanuric chloride in 110 parts by volume of acetone was added dropwise at 0 to 5° C. to 200 parts by volume of water in the course of 10 minutes and then a solution of 16.2 parts of meta-trifluoromethylphenol in 25 parts by volume of acetone was added dropwise at —5 to 0° C. in the course of 10 minutes. 8.4 parts of sodium bicarbonate were then quickly sprinkled into the mixture and the whole stirred until the cyanuric chloride disappeared. The resulting 2-(meta-trifluoromethylphenoxy) - 4:6 - dichloro - symmetrical - triazine was filtered, washed with water and dried in vacuo at 60 to 80° C. After recrystallization from ligroin (B.P. 100 to 140° C.), the pure product melted at 96.5 to 98° C. (corrected). The following were obtained in an analogous manner:

2 - (2'-chlorophenoxy)-4:6-dichloro-symmetrical-triazine, M.P. 96.5 to 97.5° C. (corrected), and 2 - (4'-chlorophenoxy)-4:6-dichloro-symmetrical-triazine, M.P. 111 to 112.5° C. (corrected).

*Example 2*

1 part of the dyestuff obtained as described in Example 1 was vatted at 50° C. in 100 parts of water with 2 parts of sodium hydrosulfite in the presence of 4 parts by volume of 30% sodium hydroxide solution. The stock vat so obtained was added to a solution of 6 parts by volume of 30% sodium hydroxide solution and 2 parts of sodium hydrosulfite in 2000 parts of water. 100 parts of cotton were dyed for 1 hour at 50° C. in the dyebath so obtained in the presence of 20 parts of sodium chloride. The cotton was then squeezed, oxidized in the air, rinsed, acidified, rinsed again and then soaped at the boil. It was dyed a strong blue and the dyeing possessed very good properties of fastness.

What is claimed is:
1. An anthraquinone vat dyestuff of the formula

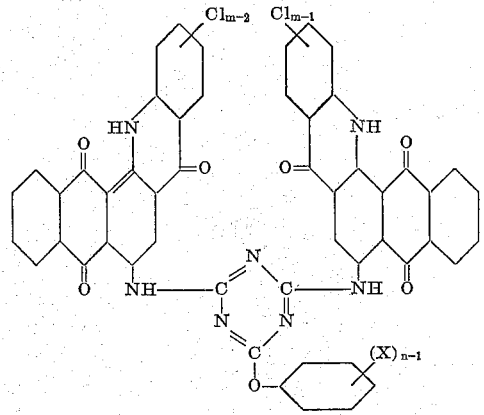

in which X is a member selected from the group consisting of chlorine and trifluoromethyl, $m$ is a whole number of at most 2 and $n$ is a whole number of at most 3.

2. The anthraquinone dyestuff of the formula

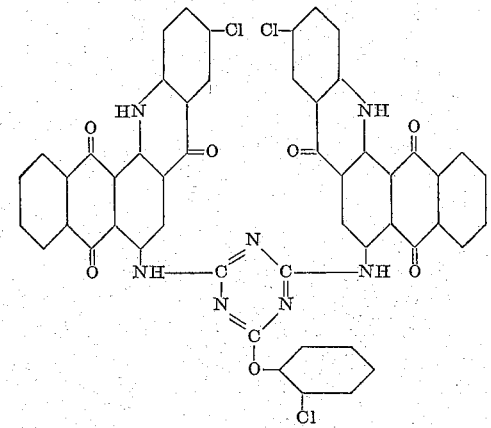

3. The anthraquinone dyestuff of the formula

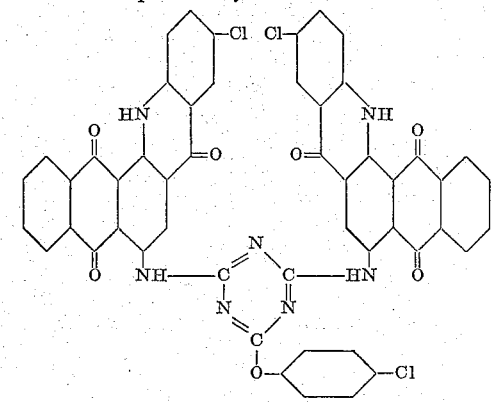

4. The anthraquinone dyestuff of the formula

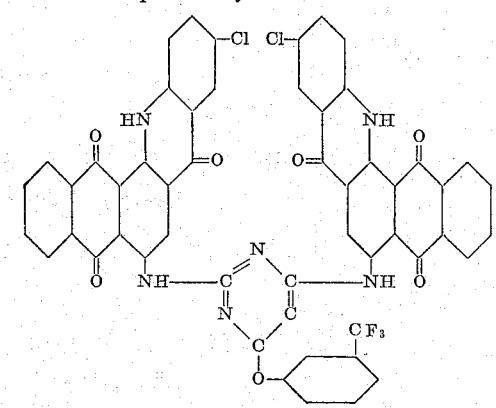

5. The anthraquinone dyestuff of the formula
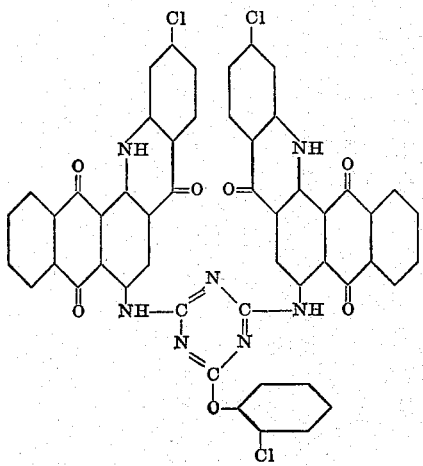
6. The anthraquinone dyestuff of the formula
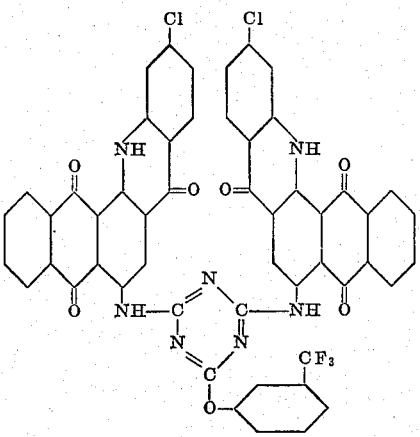
References Cited in the file of this patent
UNITED STATES PATENTS
| | | |
|---|---|---|
| 1,568,627 | Schetelig | Jan. 5, 1926 |
| 1,663,474 | Ackermann | Mar. 20, 1928 |
| 1,719,792 | Ackermann et al. | July 2, 1929 |
| 1,994,602 | Wieners | Mar. 19, 1935 |
| 2,567,821 | Moergelic | Sept. 11, 1951 |
| 2,716,645 | Von | Aug. 30, 1955 |
OTHER REFERENCES
Venkataraman: "The Chemistry of Synthetic Dyes," vols. I and II, Academic Press, Inc., N.Y., 1952, pp. 69, 348, 479, 916, 920, 925 and 1221.

UNITED STATES PATENT OFFICE
CERTIFICATE OF CORRECTION

Patent No. 3,164,593                                                January 5, 1965

Eduard Moergeli

It is hereby certified that error appears in the above numbered patent requiring correction and that the said Letters Patent should read as corrected below.

Column 4, lines 3 to 19, for the upper left-hand portion of the formula reading:

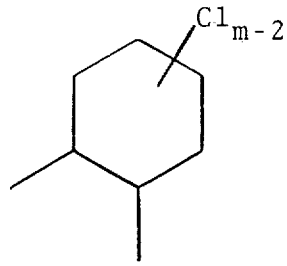     read     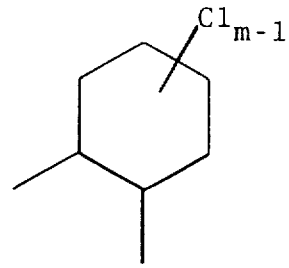

same column 4, lines 60 to 75, for the lower center portion of the formula reading:

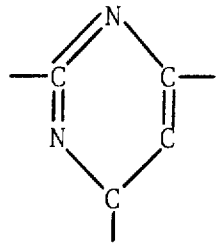     read     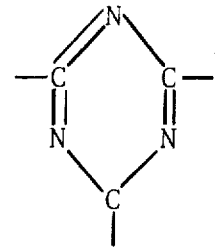

Signed and sealed this 11th day of May 1965.

(SEAL)
Attest:

ERNEST W. SWIDER                                          EDWARD J. BRENNER
Attesting Officer                                        Commissioner of Patents